UNITED STATES PATENT OFFICE.

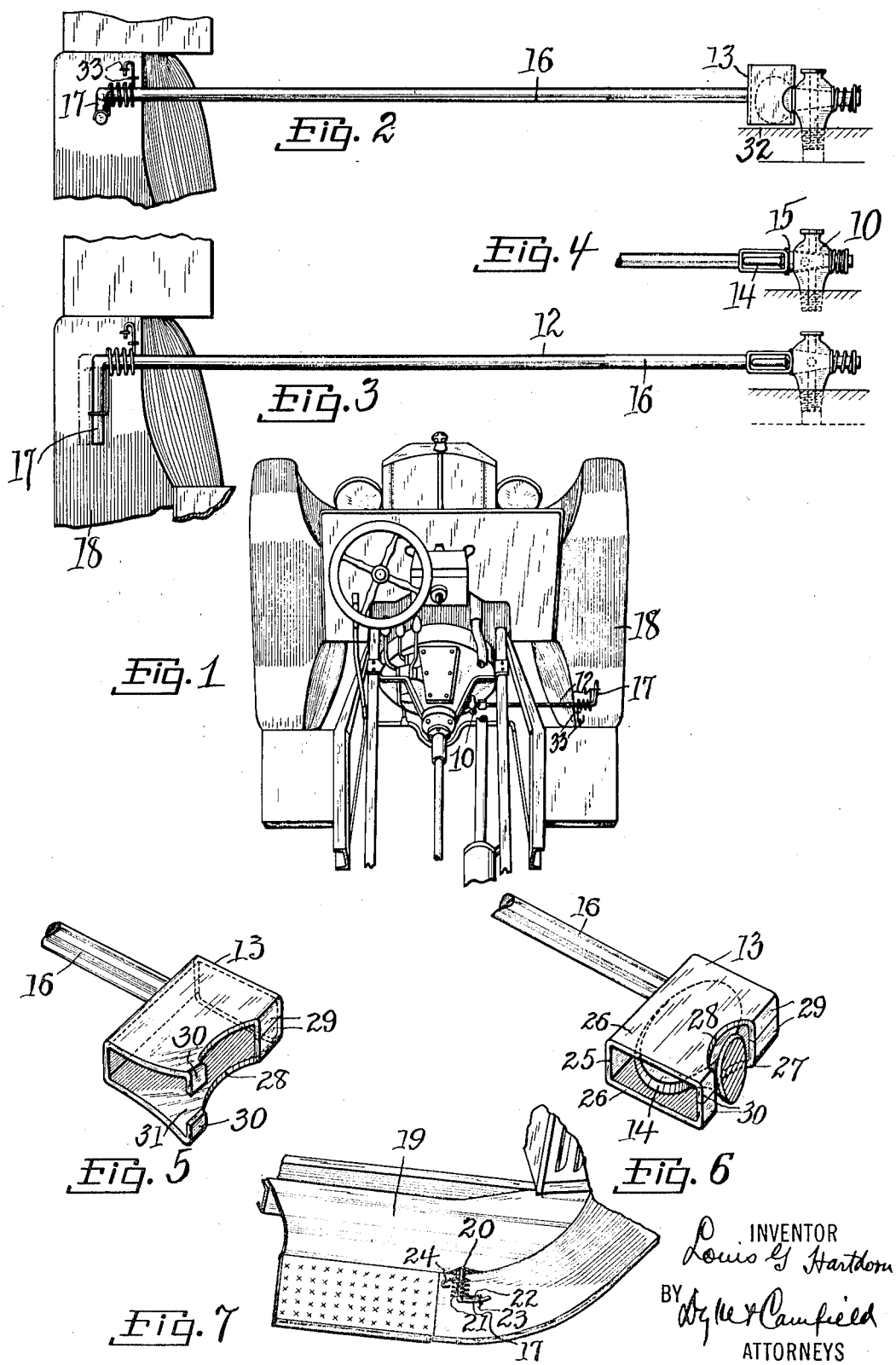

LOUIS G. HARTDORN, OF NEW YORK, N. Y.

PETCOCK-WRENCH.

1,311,889. Specification of Letters Patent. Patented Aug. 5, 1919.

Application filed July 2, 1918. Serial No. 242,987.

*To all whom it may concern:*

Be it known that I, LOUIS G. HARTDORN, a citizen of the United States, and a resident of New York, county of New York, and State of New York, have invented certain new and useful Improvements in Petcock-Wrenches, of which the following is a specification.

My invention relates to pet cock wrenches and is designed particularly for operation of the oil pet cocks on Ford automobiles. Among the objects of the invention are the provision of a readily accessible and easily operated wrench for the purpose referred to, which will enable such oil cock to be readily opened when desired without the necessity of getting under the car or into an awkward position.

A further object of the invention is the provision of means for holding the oil cock in closed position so that it may not be accidentally opened.

My invention further relates to improvement of articles of the character referred to in a number of particulars, and with the foregoing and related objects in view, my invention consists in the parts, improvements and features of construction herein set forth and claimed.

In the accompanying drawing I have shown, for the purpose of affording an understanding of my invention only and not for limitation, one form in which the invention may be embodied. In said drawing, Figure 1 is a perspective view of a part of a Ford automobile having a pet cock wrench in accordance with the present invention thereon. Fig. 2 is an elevation of the pet cock wrench. Fig. 3 is a view similar to Fig. 2, but showing a different position. Fig. 4 is a fragmentary elevational view showing the pet cock valve withdrawn against its spring to loosen it. Fig. 5 is a perspective view of the wrench head before being placed on the pet cock. Fig. 6 is a perspective view of the wrench head in place on the pet cock, and Fig. 7 is a fragmentary perspective view showing the handle of a pet cock wrench in place on a Ford car equipped with a splash apron.

The test oil cock of an engine of a Ford automobile is designated at 10. This pet cock is located at such a position and at such a level in the engine base or crank case that when there is sufficient oil in the crank case, oil will flow or drip out of the pet cock 10 when opened, and if no oil flows out an indication is afforded that additional oil should be placed in the crank case until it flows out at this point. As will be apparent, such pet cock is so located as not to be readily accessible, and it is a matter of some difficulty to get at it and open and close it, the operation also being usually accompanied by soiling the hands and clothing of the operator, who has to get down on his knees on the ground or floor.

Such pet cock is usually spring held to its seat and must be pulled outward somewhat to loosen it from its seat before it can be readily turned.

The wrench of the present invention is adapted to eliminate the difficulties referred to. It is designated generally by the reference numeral 12. It has a head 13 designed to be secured to the thumb-piece 14 of the valve 15 of the pet cock 10, and a shank 16 and a handle 17 at the end of the shank 16 opposite the head 13, which handle may be conveniently provided by bending the end of the shank 16 at right angles, substantially as shown. The shank 16 is of sufficient length to enable the handle 17 to be located at a conveniently accessible point. One place where the handle can be located and made readily accessible is on top of the rear end of the front mud guard 18, and in the drawing it is illustrated in such position. When the automobile is equipped with a splash or dust apron, as shown at 19, Fig. 7, the shank 16 is preferably placed beneath such apron and between it and the mud guard 18, and room for its insertion may be provided, for example, by forcing up the edge of the splash apron 19 by a screwdriver or similar tool, whereby an opening is provided, as at 20, for the insertion of the shank 16. When the handle 17 lies flat on the mud guard 18, as shown in Figs. 3 and 7, the valve 15 is preferably closed, and spring means are preferably provided for preventing rattle of the wrench and for holding it in a position corresponding to the closed position of the valve 15. In the form shown the outer end of the shank 16 is encircled by a spring 21 having an arm 22 terminating in a hook 23 to take over the handle 17 and having an oppositely extending arm 24 which rests upon the mud guard 18. If there should be any looseness between the apron 19 and the mud guard 18, the arm 24 may be fastened to the mud guard, as by a bolt through the hook portion at the end of it, or in any other suitable manner.

The head 13 of the wrench 12 is so constructed as to be readily secured to the thumb-piece 14 of the pet cock and to turn the same, and also is so secured thereto as that the wrench 12 may be used to loosen the pet cock preparatory to turning it. In the form shown the head 13 comprises a back wall 25 and side portions 26, 26. Its end wall, designated generally by the reference numeral 27, is provided with a cut-out, as shown at 28, in which the head 13 may be received. One end of such outer wall is preferably closed, as, for example, the side portions 26 may be provided with substantially meeting lugs 29, 29 which serve to close the end wall of the head on that side of the opening 28. The opposite end of the head is preferably provided with lugs 30, 30 which are normally separated, leaving an opening between them, as designated at 31, Fig. 5, and these may be brought together as by means of a plier or like instrument, the head being preferably of sheet metal, such as mild steel, and adapted to be readily bent and holding the shape given to it by bending. As will be observed from inspection of Fig. 2, the openings 28 are not central in the head 13 but slightly at one side thereof. Such arrangement is preferable since the cock 10 and the thumb-piece 14 are located quite close to the wall 32 of the engine, and preferably in placing the head 13 on the thumb-piece 14 it is placed with the opening 31 on the side toward the engine wall 32, the lugs 30, 30 being shorter than the lugs 29, 29, so that the openings 28, 28 are closer to that end than to the opposite end of the head 13, as shown in Fig. 5. In such position the thumb-piece 14 projects out of or at least lies close to that end of the head 13 having the lugs 30, 30, as shown clearly in Fig. 6, and by compressing the head 13 at the corner where the lugs 30, 30 are located, the same are readily brought together and the wrench head 13 secured in place on the thumb-piece 14, as is clearly shown in Fig. 6.

With its head so attached to the pet cock thumb-piece, it will be seen that the wrench can be used to turn the valve 15, or, if desired, the wrench may be used to pull on the head 13, loosening the valve 15 from its seat, as shown in Fig. 4, the corresponding position of the handle 17 being indicated in dotted lines in Fig. 5.

With some types of Ford automobiles, as, for example, those equipped with delivery bodies, the apron 19 may not be present, and in such case the spring 21 may be fastened to the mud guard 18 as by means of wires or staples 33 attached to the arm 24, or may be otherwise secured thereto, as by means of bolts, screws or the like, as will be readily understood.

The operation of a pet cock wrench in accordance with the invention will be readily understood from the foregoing. It is quickly and readily put in place by simply fastening the head 13 over the thumb-piece 14 of the pet cock and bending down the corner of the head, bringing the lugs 30, 30 together, the handle being placed in desirably accessible position, as in the position shown upon the rear end of the front mud guard. To operate the wrench it is only necessary to turn the handle 17 to the position shown in Fig. 2, whereupon the valve will be opened, and when closed, the spring 21 serves to hold the handle 17 so as to keep the valve closed, or if the valve should be tight in its seat and not readily turned, it may be loosened before turning by pulling the handle 17 to the dotted line position shown in Fig. 3, whereby the spring 15' of the pet cock will be compressed and the valve 15 freed from its seat so that it may be readily turned. If, by any chance, the valve 15 should work loose so that it might be turned by vibration in the running of the car, it will be held in its proper closed position by means of the spring 21, and thus an additional assurance is provided that the oil will not be permitted to run out and be wasted while the car is running.

It is to be understood that the construction shown is intended only for the purpose of affording an understanding of my invention, and that modifications and changes therein may be resorted to within the scope of my claims and without departing from or sacrificing any of the advantages of the invention.

I claim:

1. A pet cock wrench comprising a head formed of sheet metal and providing substantially an inclosure for the pet cock thumb piece and adapted to be loosely but permanently engaged with the thumb-piece of the pet cock in such manner as to permit its being used to exert both a pulling and a turning action thereon, a shank and a handle extending to an accessible position, and means for resiliently holding said handle in position for keeping the pet cock closed.

2. A pet cock wrench comprising a hollow head adapted to receive the head of the pet cock thumb-piece, said head having an opening in its end wall adapted to permit the neck of such thumb-piece to pass therethrough, said head having normally separated lugs at one end and made from material such as sheet metal which may be readily bent to obtain permanent engagement of the pet cock by the wrench head and to prevent said head from being pulled off the thumb-piece of the pet cock, a shank secured to said head and adapted to extend from the engine to the front mud guard of an automobile, a handle on the shank, and a spring encircling the shank and adapted to resiliently hold the handle down against the mud guard.

In testimony that I claim the foregoing I hereto set my hand this 23d day of April, 1918.

LOUIS G. HARTDORN.